United States Patent Office 2,921,191
Patented Jan. 12, 1960

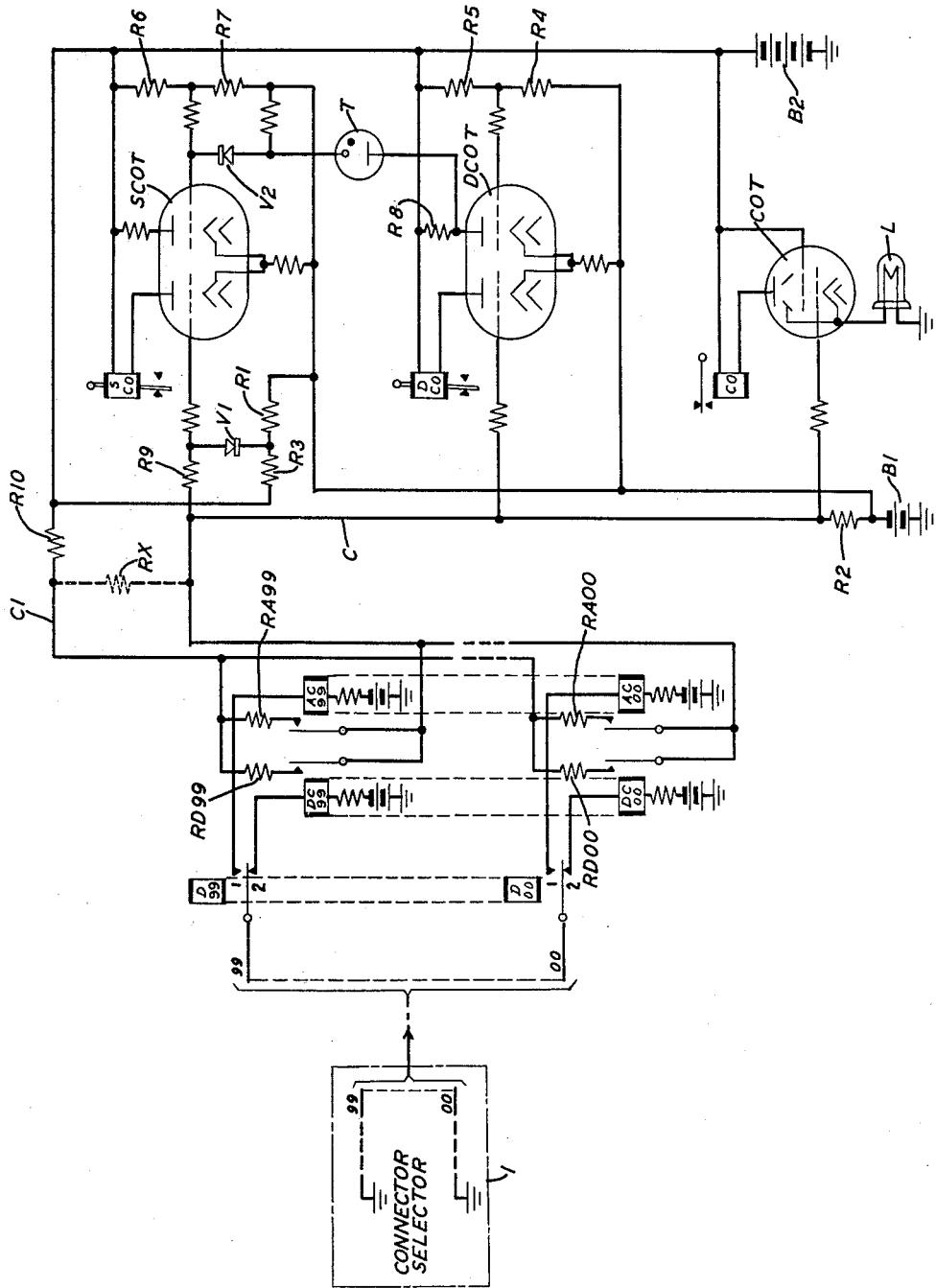

2,921,191
ELECTRICAL TESTING DEVICE

Kenneth K. Kennedy, West Caldwell, N.J., assignor to Bell Telephone Laboratories, Incorporated, New York, N.Y., a corporation of New York Application May 13, 1955, Serial No. 508,104

6 Claims. (Cl. 250—27)

This invention relates generally to electrical testing devices and more particularly to such devices for testing and detecting various electrical conditions to which they may be subjected.

Frequently in electrical circuit operation it is advisable and often is necessary to monitor the electrical condition of a conductor or apparatus element or circuit in order to detect undesired as well as desired conditions. The present invention is in the nature of such a testing circuit which can monitor the electrical condition of a component or circuit and which will operate selectively for various conditions detected thereby.

Generally, the exemplarly embodiment of the present invention comprises a circuit for detecting various levels of voltage on a conductor. The circuit is subjected continuously to the conductor potential and includes a number of voltage and current responsive circuit elements whereby a different operative condition of the circuit will exist for different voltage levels detected.

The main object of the invention is to improve the reliability of such testing devices and to enable rapid action at a high level of reliability.

The testing circuit illustrative of the invention includes at least two electron discharge devices each having two principal conducting conditions, namely, off and on. The bias circuits for each device are arranged such that a change of conduction condition in each device will be caused by a different level of voltage applied thereto. Also, there is circuitry interconnecting the devices whereby if a certain one thereof changes its condition it will prevent the other one from so doing under certain circumstances.

Particularly, two dual-triode tubes are arranged in respective voltage comparator circuits whereby under normal conditions both will be in condition A (for instance both conducting on side 1 and non-conducting on side 2). Each is provided with a bias circuit on side 1 and an input circuit on side 2. The input circuits are interconnected to the conductor whose potential is to be tested. The respective bias circuits are arranged such that the first tube will flip over if the tested potential exceeds a first specified amount and such that the second tube will flip over if the tested potential exceeds a second specified amount greater than the first amount. Circuit means interconnects the two bias circuits and is effective whenever the second tube flips over to prevent the first tube from so doing. Each tube is arranged to operate a separate relay when and if the respective tube is flipped over, thereby providing a selective relay operation indicative of different detected potential levels.

The invention will be more fully understood from the following detailed description of an embodiment thereof as shown on the drawing, which consists of a single sheet.

In the drawing a connector selector circuit 1 is shown whereby one or more of a hundred conductors 00 to 99 may be grounded. A hundred steering relays D00 to D99 are shown and may be arranged in operated or released conditions depending upon factors not of immediate interest. Relay D00, for instance, if released (as shown), will extend conductor 00 over its contact 2 to the winding of the connector relay DC00 and relay D00, if operated, will extend conductor 00 over its contact 1 to connector AC00, etc.

Three possible conditions are of interest with respect to connectors DC00, AC00, DC99, AC99, etc. One condition is where none of these connectors is operated; a second condition is where only one of them is operated; and, a third condition is where two or more are operated.

The vacuum tube C0T is arranged to cause the operation of relay C0 whenever one or more connectors DC00, etc. is (or are) operated and to prevent the operation of relay C0 when no connectors DC00, etc. are operated.

The vacuum tubes DC0T and SC0T are arranged in interconnected circuits whereby relay SC0 is operated and relay DC0 is released when only one connector DC00, etc. is operated and whereby relay DC0 is operated and relay SC0 is released whenever two or more connectors DC00, etc. are operated.

A test conductor C is connected into the left grid circuits of tubes SC0T and DC0T and into the grid circuit of tube C0T. This conductor C is arranged such that with no connectors operated it will be at about 50 volts direct current (all voltages etc. are direct current) below ground potential, to be referred to as "minus" 50 volts, and with only one connector operated it will be at about 24 volts direct current above ground potential, to be referred to as "plus" 24 volts, and with two or more connectors operated it will be at plus 55 volts or more.

These various voltage levels on conductor C come about through the agency of a potentiometer circuit wherein the value of a resistance section is changed depending upon the number of connectors operated. The main potentiometer circuit extends from ground to the negative side of battery B2, out the positive side of battery B2 (about plus 130 volts), through resistance R10 to conductor C1, through the amount of resistance RX which is the effective resistance between conductors C1 and C, to conductor C, through resistance R2, to the negative side of battery B1 (about minus 50 volts), the positive side of which is grounded. A resistor RD00, RA00 to RD99, RA99 is associated with each connector DC00, AC00 to DC99, AC99 and is connected between conductors C and C1 whenever the associated connector is operated. With no connectors operated, there is practically infinite resistance RX and conductor C stands at about minus 50 volts, the value of battery B1. With only one conductor operated, RX is of a value determined by the value of one of the resistances RD99, etc., and is such a value as will cause conductor C to stand at about plus 24 volts. With two connectors operated, two of the resistances RD99, etc. will be in parallel between conductors C and C1 and RX will be such a value as to cause conductor C to stand at about plus 55 volts. More than two connectors operated will cause conductor C to stand at a higher positive voltage than plus 55 volts.

The normal condition of the circuit is with no connectors operated. Conductor C is at minus 50 volts under these circumstances, tube C0T is non-conducting, tubes SC0T and DC0T are non-conducting in their left halves and conducting in their right halves, and relays C0, DC0 and SC0 are released. Resistance R10 is used merely as a current limiting impedance to protect the battery B2 in case a false ground should get onto conductor C1.

The potentiometer comprising resistances R1 and R3 extends from plus 130 volts to negative battery B1 (minus 50 volts) and is so arranged that the lower terminal of the varistor V1 is maintained at about plus 24 volts. The varistor V1 conducts (and becomes of very low impedance) when its upper or arrow terminal is more positive than its lower terminal. Since the lower terminal is held at about plus 24 volts, the upper terminal cannot go more positive than that. This means that the left grid of tube SC0T cannot be driven more positive than about plus 24 volts regardless of how high the conductor C may go positively.

The potentiometer comprising resistances R4 and R5, extending from plus 130 volts to minus 50 volts, arranges to maintain the right grid of tube DC0T, at about plus 40 volts.

The potentiometer comprising resistances R6 and R7, extending from plus 130 volts to minus 50 volts, arranges to maintain the right grid of tube SC0T at about plus 12 volts. With the right-hand part of tube DC0T conducting, there is a current flowing through the gas diode T; its upper electrode stands at about plus 5 volts and its lower electrode at about plus 80 volts. This 75 volt drop in tube T is always about the same.

The tubes SC0T and DC0T are arranged in voltage comparator circuits; that is, they will conduct on the right halves when the right grids are more positive than the left ones and will conduct on the left halves when the reverse is the case. Only one side conducts at one time. It is, therefore, apparent that tube SC0T will flip over to conduct on its left side (thereby to operate relay SC0) when conductor C is raised from minus 50 volts (no connectors operated) to plus 24 volts or higher (one or more connectors operated). Tube DC0T will flip over to conduct on its left side (to operate relay DC0) when conductor C is raised to plus 55 volts or higher (two or more connectors operated). Tube DC0T will flip back to its right side when conductor C drops to plus 24 volts or lower and tube SC0T will flip back to its right side when conductor C drops to minus 50 volts.

It is not desirable for tube SC0T to be operated on its left side when conductor C goes to plus 55 volts or higher because then both of the relays DC0 and SC0 would be operated. It is desired that relay SC0 operate only to indicate a single connector operated (conductor C at plus 24 volts). It is desired that relay DC0 operate to indicate more than one connector operated (conductor C at plus 55 volts or higher). Tube C0T will conduct (to operate relay C0) when one or more connectors is or are operated (conductor C at plus 24 volts or higher).

In order to prevent relay SC0 from operating when and if conductor C should rise to plus 55 volts or higher, the circuit at the right plate of tube DC0T (plate resistor R8) is arranged to increase the positive voltage on the lower terminal of tube T by about 40 volts whenever the tube DC0T flips over from the right to the left side. This will cause the upper electrode of tube T to assume a potential of about plus 45 volts since the tube drop in tube T is about 75 volts. Since the varistor V2 becomes low impedance when its lower or arrow terminal is more positive than its upper terminal (upper is at plus 12 volts and lower is at plus 45 volts), the right grid of tube SC0T will be driven more positive than plus 24 volts (actually nearly to plus 45 volts) whenever tube DC0T flips from its right side to its left side. Since the left grid of tube SC0T cannot go more positive than about plus 24 volts due to the action of varistor V1, the tube SC0T will be forced to remain conducting on its right side whenever tube DC0T flips to its left side. This insures that only relay DC0 will be operated (along with relay C0 of course) when conductor C goes to plus 55 volts or higher.

Tube C0T conducts and operates relay C0 when one or more connectors is or are operated; tube SC0T flips from right to left to operate relay SC0 when only one connector is operated; tube DC0T flips from right to left to operate relay DC0 when two or more connectors are operated; and, the interconnecting circuits between the right sides of tubes DC0T and SC0T force tube SC0T to remain conducting on its right side (keeping relay SC0 released) whenever more than one connector is operated.

Resistance R9 decouples the clamping action of varistor V1 from the other tube input circuits.

It may be desirable to inject some delay into the operation of relay SC0 in order to insure that relay SC0 does not falsely operate, to give an erroneous indication, due to some time delay in operating a second connector. Such means for delaying the operation of relay SC0 are well known in the art.

The resistance lamp L, in the cathode circuit of tube C0T, is used to widen the range of grid voltages over which sufficient plate current will flow through tube C0T, to operate relay C0, without having excessive grid currents with high grid voltages. The variable resistance (increases with increases of current due to higher temperatures) of the lamp will also tend to reduce grid current flow because, as the grid voltage goes up (more positive), the cathode voltage will tend to follow more closely than with a fixed resistance.

It is to be understood that the above-described arrangements are merely illustrative of the application of the principles of the invention. Numerous other arrangements may be devised by those skilled in the art without departing from the spirit and scope of the invention.

What is claimed is:

1. An electrical testing device comprising a first electron discharge device operable only by a first voltage level applied thereto, a second electron discharge device operable by said first or a second voltage level applied thereto, means for applying a voltage of said first level to both devices concurrently, and voltage responsive circuit means interconnecting said two devices and controlled by an operation of said first device for preventing the operation of said second device when both have applied concurrently thereto said first level voltage.

2. An electrical testing device comprising a first pair of electron discharge tube paths in a circuit including one normally non-conducting electron discharge path, another normally conducting electron discharge path and a first circuit means including an impedance common to said first pair and arranged to prescribe a first level of voltage which if applied to said first pair will reverse the conducting and non-conducting conditions of said first pair; a second pair of electron discharge tube paths in a circuit including a first normally non-conducting electron discharge path, a second normally conducting electron discharge path and a second circuit means including an impedance common to said second pair and arranged to prescribe a second level of voltage such that either said first or a second level of voltage if applied to said second pair will reverse the conducting and non-conducting conditions of said second pair; means for applying a voltage of said first level to both pairs concurrently; and a voltage responsive circuit interconnecting said first and said second circuit means and controlled by a reversal of current conditions in said first pair for forcing said second pair to remain normal.

3. An electrical testing device comprising a first pair of control grid vacuum tubes in a first voltage comparator circuit including a common load impedance and bias circuits for prescribing a first level of grid voltage which if applied to said first pair will reverse the normal current conditions in respective tubes, a second pair of control grid vacuum tubes in a second voltage comparator circuit including a common load impedance and bias circuits for prescribing a second level of voltage such that either said first or said second level voltage if applied to said second pair will reverse the normal current conditions in respective tubes, means for applying a voltage of said first level to both pairs concurrently, and a voltage responsive circuit interconnecting said bias circuits of said pairs and controlled by a reversal of current conditions in said first pair for forcing said second pair to remain normal.

4. An electrical testing device comprising a first double triode vacuum tube in a first voltage comparator circuit including a common cathode impedance, a first triode section having a grid bias circuit normally biasing the grid below cut-off and arranged to prevent the grid from being driven more positive than a first voltage level, a second triode section having a grid bias circuit normally biasing the grid in the conducting region below said first voltage level; a second double triode vacuum tube in a second voltage comparator circuit including a common cathode impedance, a first triode section having a grid bias circuit normally biasing the grid below cut-off and arranged to permit the grid to be driven more positive than said first voltage level, a second triode section having a grid bias circuit biasing the grid in the conducting region approximately as positive as said first voltage level; means for applying to both first triode section grid circuits a voltage more positive than said first level; and a voltage responsive circuit interconnecting said second triode sections and controlled by a reversal of current conditions in said first tube for forcing said second tube to remain normal.

5. An electrical testing device comprising at least two detecting means, one detecting means operable only by a first electrical condition when subjected thereto, another detecting means operable by said first or a second electrical condition when subjected thereto, means for subjecting both detecting means concurrently to said first electrical condition, and means controlled by an operating of said one detecting means for rendering inoperable the other when both are subjected concurrently to said first electrical condition.

6. An electrical testing device comprising at least two voltage responsive detectors, one detector operable only by a first voltage level applied thereto, another detector operable by said first or a second voltage level applied thereto, means for applying said first voltage level to said detectors concurrently, and means interconnecting said two detectors and controlled by an operation of said one detector for rendering inoperable the other when both have applied concurrently thereto said first electrical condition.

References Cited in the file of this patent

UNITED STATES PATENTS

| | | | |
|---|---|---|---|
| 2,290,992 | Peterson | July 28, | 1942 |
| 2,428,126 | Nicholson | Sept. 30, | 1947 |
| 2,486,391 | Cunningham | Nov. 1, | 1949 |
| 2,572,912 | Bucher | Oct. 30, | 1951 |
| 2,603,123 | Loukomscky et al. | July 15, | 1952 |
| 2,620,400 | Snijders | Dec. 2, | 1952 |
| 2,650,332 | Bordewieck | Aug. 25, | 1953 |
| 2,684,479 | Hill et al. | July 20, | 1954 |
| 2,708,254 | Macaulay et al. | May 10, | 1955 |